US011869108B1

(12) United States Patent
Flaxman et al.

(10) Patent No.: US 11,869,108 B1
(45) Date of Patent: Jan. 9, 2024

(54) INVENTION DISCLOSURE SYSTEM

(71) Applicants: Howard N Flaxman, McLean, VA (US); John L Welsh, McLean, VA (US)

(72) Inventors: Howard N Flaxman, McLean, VA (US); John L Welsh, McLean, VA (US)

( * ) Notice: Subject to any disclaimer, the term of this patent is extended or adjusted under 35 U.S.C. 154(b) by 0 days.

(21) Appl. No.: 13/621,471

(22) Filed: Sep. 17, 2012

Related U.S. Application Data

(60) Provisional application No. 61/535,025, filed on Sep. 15, 2011.

(51) Int. Cl.
*G06Q 50/18* (2012.01)

(52) U.S. Cl.
CPC .................. *G06Q 50/184* (2013.01)

(58) Field of Classification Search
CPC ...................................... G06Q 50/184
See application file for complete search history.

(56) References Cited

U.S. PATENT DOCUMENTS

| | | | | |
|---|---|---|---|---|
| 7,464,108 B1 * | 12/2008 | Sorensen | ............... | G06Q 10/06 |
| 7,562,053 B2 * | 7/2009 | Twining | .................. | G06F 21/64 |
| | | | | 705/80 |
| 8,386,623 B2 * | 2/2013 | Thomas | ................. | G06Q 30/02 |
| | | | | 705/37 |
| 2001/0010050 A1 * | 7/2001 | Sakata | .................. | G06F 16/958 |
| | | | | 715/255 |
| 2002/0016727 A1 * | 2/2002 | Harrell | ............... | G06Q 30/0201 |
| | | | | 705/7.29 |
| 2004/0186738 A1 * | 9/2004 | Reisman | ................ | G06Q 10/10 |
| | | | | 705/26.1 |
| 2006/0106627 A1 * | 5/2006 | Al-Nujaidi | ............ | G06Q 10/10 |
| | | | | 705/310 |
| 2008/0140786 A1 * | 6/2008 | Tran | ....................... | G06Q 10/10 |
| | | | | 709/206 |
| 2008/0215474 A1 * | 9/2008 | Graham | ......................... | 705/37 |

OTHER PUBLICATIONS

"Designing Drop-Down Menus: Examples and Best Practices"; Matt Cronin, Smashing Magazine, 2009 (Year: 2009).*

* cited by examiner

*Primary Examiner* — Dennis W Ruhl
(74) *Attorney, Agent, or Firm* — Welsh Flaxman & Gitler LLC

(57) ABSTRACT

A system for effective, efficient and controlled public disclosure of inventions, developments and/or discoveries for protecting patent rights includes a publicly accessible central server to which a public at large is connected via a global communication network. The publicly available central server is composed of an interface module through which either a member of the public at large or an inventor, patent applicant or patent assignee is guided to either a public disclosure module or a database module. The public disclosure module provides inventors, patent applicants, and patent assignees with the ability to upload their disclosure materials relating to their inventions, developments and/or discoveries for public access via the database module. Once the disclosure material is uploaded via the public disclosure module, disclosure of the invention, development and/or discovery is incorporated into the database module for access by the public at large.

7 Claims, 4 Drawing Sheets

INVENTION SUBMISSION DATA

INVENTOR(S)

ASSIGNEE

TITLE OF THE INVENTION

PUBLIC DISCLOSURE MATERIALS

SELECT AND ATTACH FILE(S)

SEARCH, RETRIEVAL AND REVIEW TOOL 60

KEYWORD SEARCH TOOL

CLASSIFICATION SEARCH TOOL

INVENTION DISCLOSURE SYSTEM

CROSS REFERENCE TO RELATED APPLICATIONS

This application claims the benefit of U.S. Provisional Application Ser. No. 61/535,025, entitled "INVENTION DISCLOSURE SYSTEM," filed Sep. 15, 2011.

BACKGROUND OF THE INVENTION

1. Field of the Invention

This invention relates to an invention disclosure system.

2. Description of the Related Art

The enactment of the America Invents Act of 2011 changes the patent system of the United States from a "first to invent" system to a "first inventor to file" system. With this change, however, comes a grace period under 35 U.S.C. 102(b)(1) for prior art under 35 U.S.C. 102(a)(1). The grace period provides, A disclosure made 1 year or less before the effective filing date of a claimed invention shall not be prior art to the claimed invention under subsection (a)(1) if—

. . .

(B) the subject matter disclosed had, before such disclosure, been publicly disclosed by the inventor or a joint inventor or another who obtained the subject matter disclosed directly or indirectly from the inventor or a joint inventor.

With this exception comes the problem of how one goes about publicly disclosing the subject matter at issue. The present invention provides a method and system for achieving this.

SUMMARY OF THE INVENTION

It is, therefore, an object of the present invention to provide a system for effective, efficient and controlled public disclosure of inventions, developments and/or discoveries for protecting patent rights. The system includes a publicly accessible central server to which a public at large is connected via a global communication network. The system also includes inventors, patent applicants, and assignees accessing the publicly accessible server via the global communication network. The publicly available central server is composed of an interface module through which either a member of the public at large or an inventor, patent applicant or assignee is guided to either a public disclosure module of the publicly available central server or a database module of the publicly available central server. The public disclosure module provides inventors, patent applicants, and assignees with the ability to upload their disclosure material relating to their inventions, developments and/or discoveries for public access via the database module. The public disclosure module includes a date stamping tool which marks all uploaded disclosure material with the date and time the disclosure material is uploaded and the date and time the disclosure material is made available to the public via the public disclosure module. Once the disclosure material is uploaded via the public disclosure module, disclosure of the invention, development and/or discovery is incorporated into the database module for access by the public at large.

It is also an object of the present invention to provide a system wherein the public disclosure module greets inventors, patent applicants, and assignees with a screen requesting information relating to the disclosure material to be uploaded to the central server via the public disclosure module.

It is another object of the present invention to provide a system wherein the public disclosure module is provided with a disclosure control application providing inventors, patent applicants, and assignees with the ability to control the extent of the disclosure of the disclosure material.

It is a further object of the present invention to provide a system wherein a disclosure control application allows inventors, patent applicants, and assignees to specify when the disclosure material is to first be made public, when the disclosure material is to be removed from public access via the database module, limitations regarding those members of the public at large to whom the disclosure material will be made available and specification regarding those members of the public at large who will be denied access to the disclosure material.

It is also an object of the present invention to provide a system wherein the date stamping tool sends confirmation of these dates to the inventor, patent applicant or assignee uploading the disclosure material.

It is another object of the present invention to provide a system wherein the publicly available central server includes a disclosure control application which provides an interface allowing the inventor, patent applicant or assignee to select a confirmation of review of the disclosure material by a member of the public at large.

It is a further object of the present invention to provide a system wherein the database module includes an interface for searching, retrieving and reviewing information maintained therein.

It is also an object of the present invention to provide a system wherein the database module includes a keyword search tool or a classification search tool.

It is another object of the present invention to provide a system wherein the public at large connects with the publicly accessible central server using available graphical user interfaces operating on network enabled computers.

It is a further object of the present invention to provide a system wherein the inventors, patent applicants, and assignees accessing the publicly accessible using available graphical user interfaces operating on network enabled computers.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 4, a system and method for the documentation of publication dates and public distribution of information is disclosed. The present system and method is disclosed with reference to the U.S. Patent & Trademark Office and the rules and regulations under which the U.S. Patent & Trademark Office operates. However, it is appreciated the present system and method may be applied in other similar applications where the documentation of publication dates and the public distribution of information are critical.

Under the "first to file" system currently being considered by the Congress of the United States as part of the Patent Reform Act of 2011, exceptions to a strict "first to file" system allow inventors, patent applicants and assignees to publicly disclose inventions, developments and/or discoveries in a manner preventing previously filed patents/patent applications from being applied against later filed patent application. In particular, a previously filed patent/patent application will not function to prevent the granting of a patent where and with regard to disclosures appearing in applications and patents where "the subject matter disclosed had, before such subject matter was effectively filed under subsection (a)(2), been publicly disclosed by the inventor or a joint inventor or another who obtained the subject matter disclosed directly or indirectly from the inventor or a joint inventor". This allows inventors, patent applicants and assignees the ability to establish certain rights through the simple public disclosure of the invention, development and/or discovery.

Figure 1:
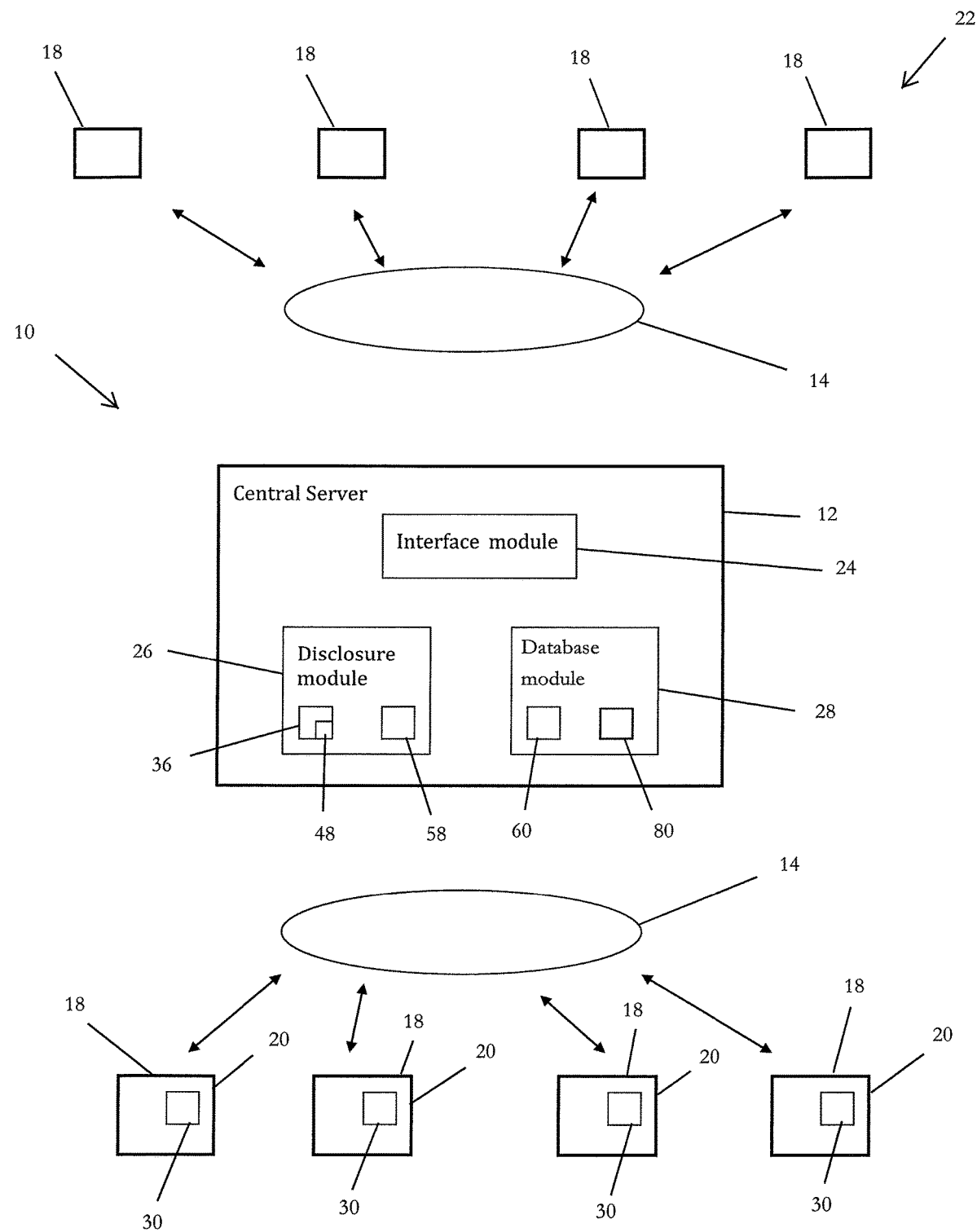
FIG. 1 is a schematic of the present system.

As will be appreciated based upon the following disclosure, the present system and method provide a mechanism for the effective, efficient and controlled public disclosure of inventions, developments and/or discoveries for the purpose of protecting patent rights under the new provisions of the Patent Reform Act of 2011. Referring to FIG. 1, the present system 10 is, therefore, composed of a publicly accessible central server 12 to which the public at large 22 is connected via a global communication network (for example, the Internet) 14. As is appreciated, the public at large 22 connects with the publicly accessible central server 12 using available graphical user interfaces operating on network enabled computers 18. In accordance with a preferred embodiment of the present invention, the graphical user interfaces are web browsers, for example, GOOGLE CHROME, MICROSOFT INTERNET EXPLORER, APPLE SAFARI, etc., accessing the central server 12.

In addition to the ability for the public at large 22 to access the publicly accessible central server 12, inventors, patent applicants, and patent assignees 20 are capable of accessing the publicly accessible central server 12. As with the public at large 22, inventors, patent applicants, and patent assignees 20 connect with the publicly accessible central server 12 using available graphical user interfaces operating on network enabled computers 18.

While the public at large 22 accesses the publicly accessible central server 12 for the purpose of researching and identifying relevant publicly available information, the inventors, patent applicants and patent assignees 20, in addition to the purpose of researching and identifying relevant publicly available information, access the publicly accessible server 12 for the purpose of publicly disclosing their inventions, developments and/or discoveries in a secure and documented manner.

With the foregoing in mind, the publicly available central server 12 is composed of an interface module 24 through which the user, that is, either a member of the public at large 22 or an inventor, patent applicant or patent assignee 20, is guided to either a public disclosure module 26 of the publicly available central server 12 or a database module 28 of the publicly available central server 12.

Briefly, and in accordance with a preferred embodiment of the present invention, the interface module 24 is a suitable and commercially available device or a combination of devices for transferring data over a global communication network. Users of the system, whether they be members of the public at large 22 searching for available disclosure materials or inventors, patent applicants and assignees 20 wishing to publicly disclose inventions, developments and discoveries for the purpose of protecting their patent rights, can remotely access and communicate with central server 12 by use of conventional personal digital assistants (PDAs), wireless phones, portable computers, and personal computers having conventional browsing software that is adapted to receive and transmit data over a global computer network(s) in a known manner.

However, before access to the central server 12 is permitted, a user must register and obtain a User ID and obtain a User Password. Registration is required so that the central server 12, using the access archive 80 as discussed below in greater detail, may maintain a record of who is reviewing or uploading disclosure material(s) using the present system 10.

Upon access to the interface module 24, the user is requested to specify whether the user wishes to access the public disclosure module 26 for uploading their disclosure material relating to his/her inventions, developments and/or discoveries for public access via the database module 28 or the user wishes to access the database module 28 for researching materials made publicly available via the public disclosure module 26. Upon selecting either the public disclosure module 26 or the database module 28, the user will be required to register and present requested log-in information.

The public disclosure module 26 provides inventors, patent applicants, and patent assignees 20 with the ability to upload their disclosure material relating to their inventions, developments and/or discoveries for public access via the database module 28. As will be discussed below in greater detail, the public disclosure module 26 provides inventors, patent applicants and patent assignees 20 with complete control over the public disclosure of their disclosure material. The public disclosure module 26 provides a mechanism for uploading disclosure material relating to inventions, developments and/or discoveries with the ability to control when, how and where the materials are made available for public review. Upon uploading the disclosure material relating to inventions, developments and/or discoveries, the inventors, patent applicants, and patent assignees 20 are provided with confirmation of the actions.

Figure 2:
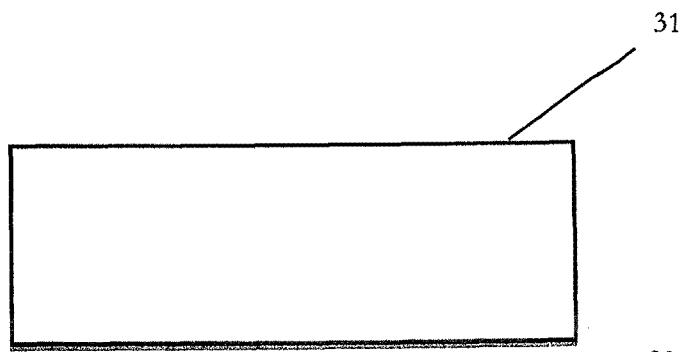
FIG. 2 is a graphical user interface screen requesting information relating to the disclosure material to be uploaded to the central server via the public disclosure module.
Figure 2:
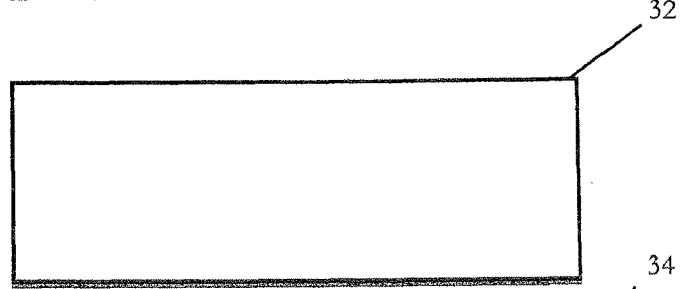
Figure 2:
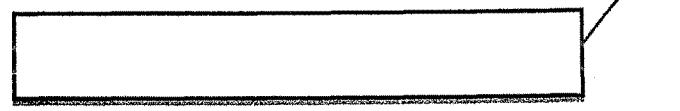
Figure 2:
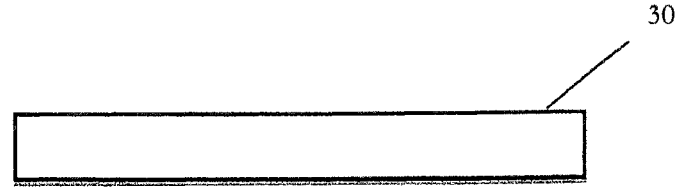

In particular, and with reference to FIG. 2, upon access to the public disclosure module 26, the user is greeted with a screen requesting information relating to the disclosure material 30 to be uploaded to the central server 12 via the public disclosure module 26. The requested information includes, but is not limited to, the name(s) of the inventors of the invention embodied in the disclosure material 31, the owner/assignee of the invention embodied in the public disclosure material 32, the title of the invention embodied in the public disclosure material 34, and the number of written pages and drawings pages.

Figure 3:
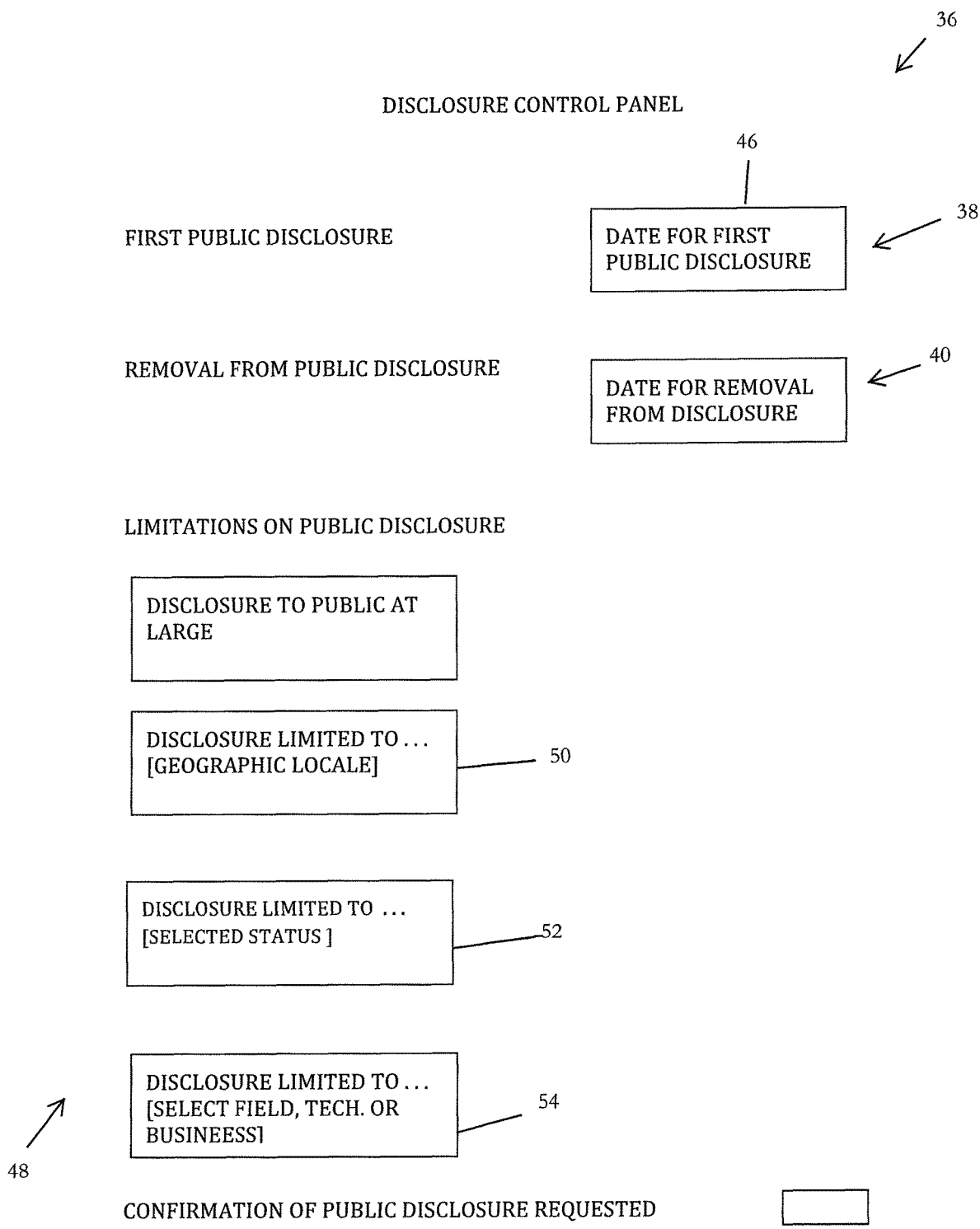
FIG. 3 is a graphical user interface for the disclosure control application.

In addition to identifying information relating to the disclosed material, the public disclosure module 26 is provided with a disclosure control application 36. Referring to FIG. 3, the disclosure control application 36 provides inventors, patent applicants, and patent assignees 20 with the ability to control the extent of the disclosure of their disclosed material. In particular, and in accordance with a preferred embodiment of the present invention, inventors, patent applicants, and patent assignees 20 may specify when the disclosure material is to first be made public 38, when the disclosure material is to be removed from public access via the database module 40, limitations regarding those members of the public at large to whom the disclosure material will be made available and specification regarding those members of the public at large who will be denied access to the disclosure material 42.

With regard to ability of the inventors, patent applicants, and patent assignees 20 to specify when the disclosure material are to first be made public, the graphical user interface provides the inventors, patent applicants, and patent assignees 20 with drop-down selection menus 44 allowing for selection of the specific date and time at which the disclosure materials are to be made public.

Similarly, and with regard to when the disclosure material are to be removed from public access via the database module 28, the graphical user interface 16 provides the inventors, patent applicants, and patent assignees 20 with drop-down selection menus 46 allowing for selection of the specific date and time at which the disclosure material will be removed from public disclosure.

It is appreciated some inventors, patent applicants, and patent assignees 20 may desire to limit the publics' access to their disclosure material. With this in mind, the present invention provides a security application 48 allowing the inventors, patent applicants, and patent assignees 20 to limit access to their disclosure material. The inventors, patent applicants, and patent assignees 20 may select various characteristics of public viewers so as to limit access to their disclosure material as they see fit. For example, public viewing of the disclosure material may be limited based upon, but not limited to, the geographic location of the member of the public desiring access to the disclosure material 50, the status (i.e., corporation, individual, academia) of the member of the public desiring access to the disclosure material 52, the field/technology/business in which the member of the public desiring access to the disclosure material works, etc. 54.

Still further inventors, patent applicants, and patent assignees 20 may require that the member of the public desiring access to the disclosure material of the inventors, patent applicants, and patent assignees 20 obtain explicit approval for access from the inventors, patent applicants, and patent assignees 20. This will be achieved by submitting identification information relating to the member of the public desiring access to the disclosure material to the inventors, patent applicants, and patent assignees 20. The inventors, patent applicants, and patent assignees 20 may then review the identification information and approve/disapprove the member of the public desiring access to the disclosure material based upon the information provided.

Once the relevant information relating to the public disclosure of the disclosure material is input and verified by the inventors, patent applicants, and patent assignees 20, the inventors, patent applicants, and patent assignees 20 may upload the disclosure material to the present server 12 for disclosure thereof in accordance with the instructions of the inventors, patent applicants, and patent assignees 20. It is appreciated uploading of the disclosure material to the central server 12 is achieved using highly secure applications, which are well known to those skilled in the art, that may be available at the time.

Once uploaded, the public disclosure module 26 includes a date stamping tool 58 which marks all uploaded disclosure material with the date and time the disclosure material is uploaded and the date and time the disclosure material is made available to the public via the public disclosure module 26. The date stamping tool further sends confirmation of these dates to the inventor, patent applicant or assignee uploading the disclosure material to the system.

A further feature in the public disclosure of inventions by the inventor, patent applicant or assignee 20 is that the present system offers a confirmation that the disclosure material has in fact been reviewed by a member of the public at large.

Once uploaded via the public disclosure module 26, and in accordance with any instructions dictated by the inventor, patent applicant or patent assignee 20, the disclosure of the invention, development and/or discovery is incorporated into the database module 28 for access by members of the public at large.

With this in mind, inventors, patent applicants or assignees 20 may request confirmation of review of the public disclosure by a member of the public at large. Such a request is made using the disclosure control application 36 which provides an interface allowing the inventor, patent applicant or assignee 20 to select a confirmation of review of the disclosure material by a member of the public at large.

When the inventor, patent applicant or assignee 20 selects confirmation of review of the disclosure material by a member of the public at large, a notification is sent to a member of the public at large requesting review of the disclosure material. The notification requesting review of the disclosure material is accompanied with a link for direct access to the disclosure material the member of the public is to review. The member of the public at large may be selected in a variety of manners, for example, via a list compiled by operators of the system, randomly from a list of users of the present system, by paid participants in a disclosure review plan, etc.

Once the notification is sent to a member of the public at large for review of the disclosure material, the member of the public at large accesses the database module 28 using the link accompanying the notification requesting review of the disclosure material or in a conventional manner available to all members of the public at large and locates the disclosure material requiring review. After completing a review of the disclosure material, the member of the public at large sends confirmation of the review, which is then sent to the inventor, patent applicant or assignee requiring confirmation of review. In addition, and as will be appreciated based upon the following disclosure regarding the provision of an access archive 80, the access and review by the member of the public is recorded and available for review by the inventors, patent applicants, and patent assignees 20.

The inventor, applicant or assignee may also obtain the name, address and contact information for the member of the public at large that reviewed the disclosure material. This information will then be used to later locate the member of the public at large should it be necessary for the member of the public at large to provide testimony regarding the review of the disclosure material at issue. With this in mind, any member of the public at large desiring to review disclosure material for the purpose of confirmation as described above will have signed an agreement ensuring future cooperation with the inventor, patent applicant, or assignee should the testimony or other cooperative efforts of the member of the public at large be required.

Figure 4:
FIG. 4 is a graphical user interface for the search, retrieval and review tool.
Figure 4:
Figure 4:
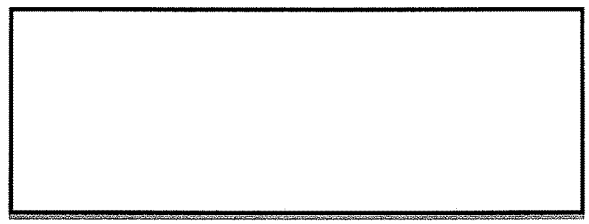
Figure 4:

Accordingly, the database module 28 includes an interface 60 for searching, retrieving and reviewing information maintained therein. The database module 28 is, therefore, provided with various tools for the searching protocol a user wishes to employ. With reference to FIG. 4, the database module 28 includes a keyword search tool 62 and/or a classification search tool 64.

The keyword search tool 62 uses traditional searching to identify relevant disclosure material for retrieval and review. As such, the keyword search tool 62 allows users to combine words and phrases while also truncating words to optimize the search results produced by the search strings employed by a user attempting to identify relevant disclosure material.

The classification search tool 64 classifies disclosure material based upon the subject matter and allows users to review all disclosure material falling within a specific subject matter in an effort to identify relevant references. In accordance with a preferred embodiment, a proprietary analysis system will review the disclosure material for the purpose of identifying the appropriate subject matter heading under which the disclosure material should be classified.

The database module 28 also provides a mechanism whereby the inventors, patent applicants, and patent assignees 20 may obtain information regarding who has reviewed their disclosure materials, when the review took place and the exact nature of the materials disclosed (for example, abstract, full disclosure, claims, etc.). In particular, the database module is provided with an access archive 80 that maintains this information in a searchable and retrievable manner.

Additionally, all disclosures made are time stamped and achieved in a permanent secure database, for example, the database module, which can only be accessed by the provider of the present invention disclosure system. It is contemplated the permanent secure archive database may only be accessed upon court order to verify the claim of an inventor, patent applicant and/or assignee as to a public disclosure and the content of the public disclosure.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system for effective, efficient and controlled public disclosure of inventions, developments and/or discoveries for protecting patent rights, comprising:
 a publicly accessible central server to which a public at large is connected via a global communication network, such that inventors, patent applicants, and assignees may access the publicly accessible central server via the global communication network;
 the publicly accessible central server is composed of an interface module through which either a member of the public at large or an inventor, patent applicant or patent assignee is guided to either a public disclosure module of the publicly accessible central server or a database module of the publicly accessible central server;
 the public disclosure module provides the inventors, patent applicants, and assignees with the ability to upload disclosure material relating to inventions, developments and/or discoveries for public access via the database module, and the public disclosure module includes a date stamping tool which marks all uploaded disclosure material with the date and time the disclosure material is uploaded and the date and time the disclosure material is made available to the public via the public disclosure module, wherein the date and time the disclosure material is uploaded and the date and time the disclosure material is made available to the public via the public disclosure module is stored in a permanent secure database and can only be accessed by an operator of the system;
 the public disclosure module further includes a disclosure control application providing the inventors, patent applicants, and assignees with an interface allowing the inventors, patent applicants, and assignees to request a paid participant in a disclosure review plan to access and review the disclosure material, sending a link to the disclosure material to the paid participant, and receiving a confirmation that the disclosure material had been accessed and reviewed by the paid participant, the confirmation including contact information for the paid participant; providing the inventors, patent applicants, and assignees with the ability to control the extent of the disclosure of the disclosure material by specifying when the disclosure material is to first be made public and when the disclosure material is to be removed from public access via the database module via drop-down selection menus allowing for selection of a specific date,
 the public disclosure module further including an access archive which records the confirmation including contact information for the paid participant should it be necessary for the paid participant to provide testimony regarding the disclosure material; and
 wherein once the disclosure material is uploaded via the public disclosure module, and the inventor, patent applicant, and assignee requests the paid participant access and review the disclosure material, a notification, with a link to the disclosure material the paid participant is to review, is sent to the paid participant to access the disclosure material, and once the public disclosure module receives confirmation from the paid participant that the disclosure material has been accessed and reviewed a public disclosure is recorded and the inventor, patent applicant, and assignee may obtain information regarding who has reviewed their disclosure materials, when the review took place, and the exact nature of the materials disclosed.

2. The system according to claim 1, wherein the public disclosure module greets the inventors, patent applicants, and assignees with a screen requesting information relating to the disclosure material to be uploaded to the central server via the public disclosure module.

3. The system according to claim 1, wherein the date stamping tool sends confirmation of dates to the inventor, patent applicant or assignee uploading the disclosure material.

4. The system according to claim 1, wherein the database module includes an interface allowing the public at large to search, retrieve and review information maintained therein.

5. The system according to claim 4, wherein the database module includes a keyword search tool or a classification search tool.

6. The system according to claim 1, wherein the public at large connects with the publicly accessible central server using available graphical user interfaces operating on network enabled computers.

7. The system according to claim 1, wherein the inventors, patent applicants, and assignees accessing the publicly accessible using available graphical user interfaces operating on network enabled computers.

\* \* \* \* \*

UNITED STATES PATENT AND TRADEMARK OFFICE
CERTIFICATE OF CORRECTION

PATENT NO. : 11,869,108 B1
APPLICATION NO. : 13/621471
DATED : January 9, 2024
INVENTOR(S) : Flaxman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1349 days.

Signed and Sealed this
Nineteenth Day of August, 2025

Coke Morgan Stewart
*Acting Director of the United States Patent and Trademark Office*